(12) United States Patent
Abe et al.

(10) Patent No.: US 6,187,201 B1
(45) Date of Patent: *Feb. 13, 2001

(54) SYSTEM FOR PRODUCING ULTRA-PURE WATER

(75) Inventors: Mitsugu Abe, Hadano; Yoshiaki Noma, Tokuyama, both of (JP)

(73) Assignee: Nomura Micro Science Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/718,440

(22) Filed: Nov. 4, 1996

(51) Int. Cl.$^7$ .................................................. B01D 61/00
(52) U.S. Cl. .................. 210/652; 210/257.2; 210/638; 210/900; 204/529; 204/634
(58) Field of Search ................. 210/321.6, 652, 210/654, 900, 639, 257.2, 638; 204/529, 539, 630, 634; 205/746; 430/399

(56) References Cited

U.S. PATENT DOCUMENTS

| | | | |
|---|---|---|---|
| 3,510,417 | * | 5/1970 | Mizutani et al. . |
| 3,510,418 | * | 5/1970 | Mizutani et al. . |
| 4,574,049 | * | 3/1986 | Pittner ................................. 210/639 |
| 5,094,732 | * | 3/1992 | Oldani et al. ..................... 204/182.4 |
| 5,522,995 | * | 6/1996 | Cockrem ............................. 210/654 |
| 5,593,554 | * | 1/1997 | Yamanaka et al. .................. 204/252 |
| 5,837,124 | * | 11/1998 | Su et al. .............................. 205/746 |
| 6,083,670 | * | 7/2000 | Sugawara et al. . |

FOREIGN PATENT DOCUMENTS

| | | |
|---|---|---|
| 2-298396 | 2/1990 | (JP) . |
| 2-40221 | 2/1990 | (JP) . |
| 4-100589 | 4/1992 | (JP) . |
| 4-57395 | 9/1992 | (JP) . |
| 5-220479 | 5/1993 | (JP) . |
| 5-198349 | 2/1995 | (JP) . |

* cited by examiner

Primary Examiner—Ana Fortuna
(74) Attorney, Agent, or Firm—Henderson & Sturm LLP

(57) ABSTRACT

A system for producing ultra-pure water having an electrodialysis unit 1, which has a membrane selectively permeable to monovalent cations and a membrane selectively permeable to monovalent anions, and a reverse osmosis unit 5 which is connected after the electrodialysis unit 1 in series.

8 Claims, 1 Drawing Sheet

SYSTEM FOR PRODUCING ULTRA-PURE WATER

TECHNICAL FIELD

The present invention relates to a system for producing ultra-pure water widely used in semiconductor plants, nuclear power plants and pharmaceutical plants.

BACKGROUND ART

Ultra-pure water containing only trace amounts of electrolytes, minute particles, organic substances (to be referred to as TOC hereinafter) has been used in semiconductor plants, nuclear power plants and pharmaceutical plants. As a system for producing such ultra-pure water, a combination of an ion-exchange unit packed with an ion-exchange resin and a reverse osmosis unit has been used widely. With such system incorporating an ion-exchange resin, however, TOC elating from the ion-exchange resin becomes so big in amount that in many cases it can not be eliminated completely by the subsequent unit on reverse osmosis.

As a means to meet such problem, the present inventors proposed a combination of an electrodialysis unit packed with ion-exchange membranes selectively permeable to monovalent cations and a reverse osmosis unit (Japanese Patent Application No. Hei-4(1992)-25180).

This system practically arrests elution of TOC: the unit on electro-dialysis removes monovalent cations such as Na+ or K+ even at extremely low concentrations, and the unit on reverse osmosis is excellent in eliminating polyvalent ions. Therefore, this system allows stable production of ultra-pure water of an extremely high purity.

However, when a variety of crude waters were treated with the system described above, it was found that elimination of TOC by the electrodialysis unit varies greatly according to the quality of the water treated, and does not proceed as expected for certain waters. More precisely, while a water sample is treated, water molecules are cleaved in association with desaltination. Because this cleavage of water molecules might affect the ion-exchange membrane, divalent cations are allowed intentionally to remain in the water, to prevent their damaging effects to the ion-exchange membrane. Contrary to expectation, however, this maneuver allows anions to remain in the water, and the amount of the anions corresponds in electric charges to those of cations to be kept intentionally in the water, especially of divalent cations such as $Ca^{2+}$ and $Mg^{2+}$. How much and what kind of anions remain in the water during such treatment vary according to the ionic balance or pH of the original water sample, but roughly speaking, inorganic carbonate ions tend to remain in the water. Among such inorganic carbonate ions, $HCO_3^-$ (bicarbonate ion) more tends to remain in the water because it can not be readily captured by the subsequent reverse osmosis unit. Thus, with this system the quality of water falls rather near the outlet.

To solve this problem, the present inventors have tried hard to develop a ultra-pure water producing system that allows production of water practically free not only from TOC but also from cations and anions by combining an electrodialysis unit capable of thoroughly removing monovalent cations and anions, and a reverse osmosis unit capable of removing polyvalent cations and anions, and further to confer the system a property which dispenses with such a maintenance work as the renewal treatment of ion-exchange resins with HCl or NaOH, that is, a necessary maintenance work indispensable to conventional systems.

As a result, the inventors advanced a step beyond the previous system which depended on the use of an electrodialysis unit only with membranes selectively permeable to monovalent cations, developed a system wherein another set of membranes selectively permeable to monovalent anions is added to above-described membranes, and found that this system could solve the problem. This finding led to the present proposal of this invention.

The present invention, being based on the finding described above, aims at providing a system for producing ultra-pure water which will allow thorough elimination of not only electrolytes, minute particles and organic substances from the crude water submitted, but also monovalent cations and anions, and divalent and polyvalent cations and anions therefrom.

DISCLOSURE OF THE INVENTION

The ultra-pure water producing system of this invention is characterized by comprising an electrodialysis unit with membranes selectively permeable to monovalent cations and another set of membranes selectively permeable to monovalent anions, and a reverse osmosis unit connected in series at the subsequent stage. This system is further characterized by having a decarbonating means together with an acidifying means at a stage prior to the electrodialysis unit.

The electrodialysis unit of the system of this invention depends on the combinational use of membranes selectively permeable to monovalent cations and another set of membranes selectively permeable to monovalent anions. The membrane selectively permeable to monovalent cations and applicable to this system includes practically all appropriate membranes publicly known, but membranes whose selective permeability constants to Na+ or a representative monovalent cation and to $Ca^{2+}$ or a representative divalent cation are both less than 0.5 ($P^{ca}_{Na}$) or membranes whose permeability constant to monovalent cations is less than 0.2 are preferably used.

As such preferred membrane selectively permeable to monovalent cations, for example, the membrane described in the Japanese Patent Laid-Open No.SHO-62(1987)-205135 can be mentioned: a modified cation-exchange membrane that is produced by having a polymer comprising quaternary ammonium base and a vinyl compound composed of 3 or more vinylbenzyl groups coated at least on one of its surfaces. The vinyl compound composed of 3 or more vinylbenzyl groups includes a compound which results from the reaction of a primary amine such as methyl amine or ethyl amine with three or more vinylbenzyl halides. This membrane selectively permeable to monovalent cations, having the selective permeability constant of less than 0.2, is most adequate for this invention.

The membrane selectively permeable to monovalent anions and applicable to this system includes practically all appropriate membranes publicly known, but membranes whose selective permeability constants to Cl— or a representative monovalent anion and to $SO_4^{2-}$ or a representative divalent anion are both less than 0.5 ($P^{SO_4}_{Cl}$) or membranes whose permeability constant to monovalent anions is less than 0.2 are preferably used.

Such preferable membrane selectively permeable to monovalent anions includes:

an anion-exchange resin membrane made of an organic polymer having anion-exchange groups, possessed of selective permeabilities to different negative ionic species and having a thin layer coated on its surface which results from the condensation of a compound with aldehyde, that is, a compound with one or more amino groups about an aromatic nucleus which, when condensed with aldehyde group or methylol group, will produce a resin with a well-developed cross-linking structure (Japanese Patent Publication No.SHO-36 (1961)-15258); an anion-exchange membrane having a thin layer made of organic low-molecule electrolytes having cation exchange groups or made of linear polymeric electrolytes having no cross-linking structure applied thereupon (Japanese Patent Laid-Open No.SHO-45(1970)-19980); and a membrane produced by a process wherein an ion-exchange membrane precursor in which a part of functional groups convertible to highly basic anion-exchange groups has been inactivated against the quaternary amine treatment is treated so as to give a quaternary amine compound which is then exposed to a peroxide solution, or reversely, the precursor is exposed to a peroxide solution, then to be treated so as to give a quaternary amine compound (Japanese Patent Publication No.SHO-56(1981)-47213).

The electrodialysis unit of this invention comprises an electrodialysis tank in which the membranes selectively permeable to monovalent cations and those selectively permeable to monovalent anions are arranged alternately. Supplying a crude water to a desaltination chamber and supplying a concentrated solution to a concentration chamber allows the crude water to be deprived of its cations and anions.

With above-described electrodialysis unit with the ion-exchange membranes, the longer it is operated, the more complete the removal of ions from the crude water. Long operation, however, will lead to the reduced production of ultra-pure water per unit time. Therefore, operation should be determined, while allowance being made for these two competitive factors; thorough removal of ions from the crude water and economic production of ultra-pure water.

The reverse osmosis unit applicable to the system of this invention includes practically all appropriate reverse osmosis units publicly known. For example, membranes made of polyamide, polyvinyl alcohol or cellulose acetate can be used as a material of the reverse osmosis membrane of this invention. The membrane can be used in the form of spirals or hollow fibers. The reverse osmosis unit can be operated with no notable restrictions, that is, it can be operated under conventionally approved conditions. For example, it can be operated under a pressure of 5–30 kgf/cm$^2$.

The ultra-pure water producing system of this invention comprises the electrodialysis unit and the reverse osmosis unit connected in series in this order. If the crude water has a high concentration of inorganic carbonates (for example 50 ppm or more in terms of $CaCO_3$ equivalent), it should be fed to a system incorporating a decarbonating means together with an acidifying means at a stage before the electrodialysis unit. As such decarbonating means, a dispersing tower packed with a filling material or a unit wherein an inert gas is circulated round to remove the water of carbonates can be preferably used.

The crude water is preferably filtered with a cartridge filter of about 1 μm. Further, an alkaline aqueous solution may be added to the crude water, to adjust its pH in a range of 8.0–9.0. This treatment allows carbon dioxide gas dissolved in the water to be converted to bicarbonate ions, which can be removed by the electrodialysis unit capable of capturing divalent ions.

As desaltination proceeds, water molecules cleave and may affect the ion-exchange membranes. To reduce such damaging effects, it is necessary to intentionally retain divalent cations in the water. However, because the ultra-pure water producing system of this invention incorporates the membranes selectively permeable to monovalent anions in addition to those selectively permeable to monovalent cations in the electrodialysis unit, the former prevents monovalent anions such as $HCO_3$— from being released into the reverse osmosis unit. Moreover, polyvalent cations and anions can be removed by the reverse osmosis unit.

The combinational use of the electrodialysis unit and the reverse osmosis unit allows thorough elimination of electrolytes, minute particles and organic substances from the crude water. Dependent on above properties, the present system allows stable production of ultra-pure water of a very high purity.

MODE FOR EMBODIYING THE INVENTION

Figure 1:
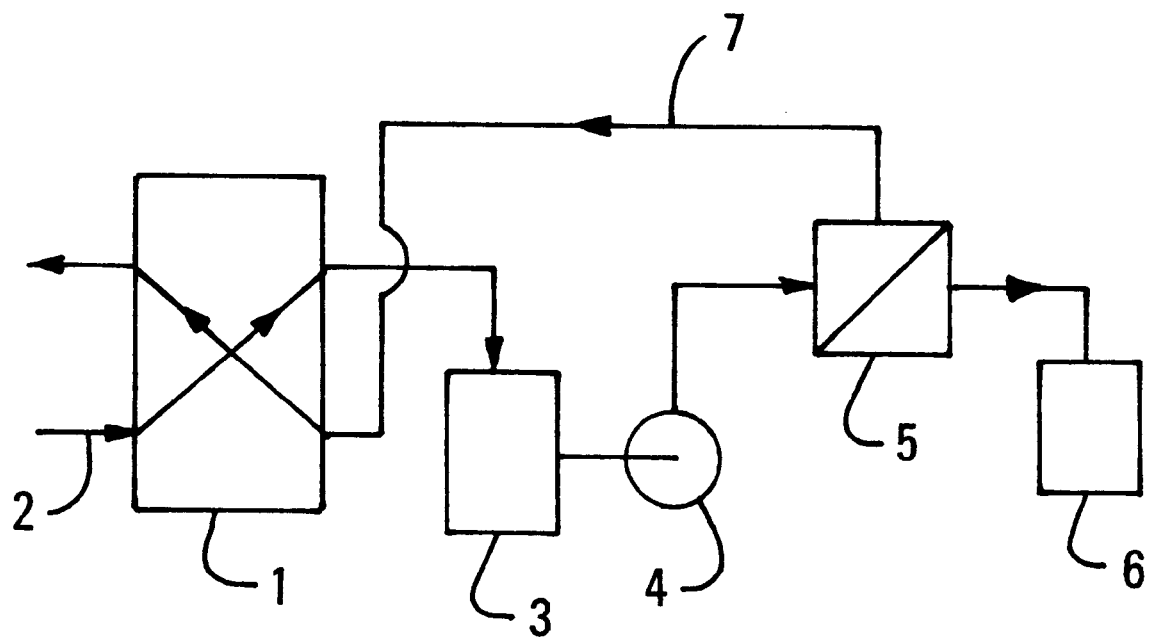
FIG. 1 is a schematic diagram indicating the constitution of one example of the ultra-pure water producing system of this invention.

Next, an example of this invention will be described with reference to the drawing, but the scope of this invention should not be limited only to this example.

FIG. 1 gives a schematic diagram indicating how one example of the ultra-pure water producing system of this invention is constructed. In this figure, 1 represents an electrodialysis unit with membranes selectively permeable to monovalent cations and those selectively permeable to monovalent anions in combination. To this unit is connected a crude water feed pipe 2. The crude water is obtained through the following procedure: tap water supplied by the water distribution system of Atsugi City is filtered through a cartridge filter of about 1 μm; hydrochloric acid was added to the filtrate to adjust its pH in a range of 5 to 6; the water thus treated is allowed to pass through a degassing tower to be deprived of carbonates; caustic soda is added to the water to adjust its pH in a range of 8 to 9; and the water is kept at 25° C.

The water treated by the electrodialysis unit 1 is transferred to and stored in a treatment tank 3. Then, the water is transferred by pump 4 to a reverse osmosis tank 5 to be treated there. Thus, the ultra-pure water obtained following two successive steps, that is, following the treatments by the electrodialysis unit 1 and by the reverse osmosis unit 5 is transferred to a ultra-pure water storage tank 6. A concentrated solution discharged from the reverse osmosis unit 5 is transferred through a concentrated waste discharging pipe 7 to a concentrated solution chamber attached to the electrodialysis unit 1 where the concentrated solution is put to reuse. This maneuver allows waste discharged from the system to be reduced.

Ultra-pure water was produced with this ultra-pure water producing system in a manner as described below. Firstly, the electrodialysis unit has the following constitution:

quaternary ammonium base resulting from the reaction between methyl amine and vinylbenzyl chloride, and a vinyl compound with three vinylbenzyl groups are polymerized to produce a polymer which is coated on one surface of a cation exchange membrane, to form a membrane selectively permeable to monovalent cations (selective permeability constant $P^{Ca}/_{Na}$=0.2) (Tokuyama, CMS-F(TM)); a membrane substrate to become selectively permeable to monovalent anions is allowed to react in a dimethylamine aqueous solution and treated with trimethylamine to form an anion exchange layer thereupon (selective permeability constant $P^{SO4}/_{Cl}=0.07$) (Tokuyama, ACS(TM)); the two kinds of membranes (each has a cross-section of 2 dm²) are arranged alternately into 10 pairs in an electrodialysis tank. Reverse osmosis was performed with a polyamide composite membrane (Toray, SU-710PN). The selective permeability constant $P^{Ca}/_{Na}$ was calculated as follows. A mixed solution comprising 0.25N NaCl and CaCl₂ in a 1:1 ratio was placed in two separate compartments with a cation exchange membrane in between, electrodialysis was continued for 40 minutes at 2 A/dm², and the amounts of Na and Ca ions carried to the opposite compartments during dialysis were measured, and inserted into the following formula.

$$P^{Ca}/_{Na}=t_{Ca}\times C_{Na}/t_{Na}\times C_{Ca}$$

(where $t_{Ca}$ represents transference of Ca ions through the cation exchange membrane, $t_{Na}$ represents transference of Na ions through the cation exchange membrane, $C_{Ca}$ represents the concentration of Ca ions prior to electro dialysis, and $C_{Na}$ represents the concentration of Na ions prior to electro dialysis.)

The selective permeability constant $P^{SO4}/_{Cl}$ was calculated as follows. A mixed solution comprising 0.1N NaCl and Na₂SO₄ in a 1:1 ratio was placed in two separate compartments with an anion exchange membrane in between, electrodialysis was continued for 40 minutes at 2 A/dm², and the amounts of Cl and SO₄ ions carried to the opposite compartments during dialysis were measured, and inserted into the following formula.

$$P^{SO4}/_{Cl}=t_{SO4}\times C_{Cl}/t_{Cl}\times C_{SO4}$$

(where $t_{SO4}$ represents transference of SO₄ ions through the anion exchange membrane, $t_{Cl}$ represents transference of Cl ions through the anion exchange membrane, $C_{SO4}$ represents the concentration of SO₄ ions prior to electro dialysis, and $C_{Cl}$ represents the concentration of Cl ions prior to electro dialysis.)

A crude water as represented in Table 1 was circulated in a dilution chamber of the electrodialysis unit 1 to be dialyzed for 70 minutes at an electric current density of 0.01 A/dm². Then, the water was transferred to the reverse osmosis unit 5 to be treated further. Ionic concentrations in the water treated by the electrodialysis unit 1 and the corresponding ones (of the ultra-pure water) after treatment by the reverse osmosis unit 5 are listed in Table 1. A 15% of the concentrated solution discharged from the reverse osmosis unit 5 was returned to the concentration chamber of the electrodialysis unit 1 for reuse.

As a comparison of the system of this invention, a ultra-pure water producing system was prepared which was practically the same with this system except that it incorporated an electrodialysis unit with membranes selectively permeable to monovalent cations and membranes having no selective permeability to anions (Tokuyama, AM-1 (TM)). The same crude water as above was processed by this system and the treated water was assayed of its ionic concentrations which are shown in Table 1 together with those of the water treated by the system of this invention.

TABLE 1

| Measured ions | Crude water | Water after dialysis (time: 70 min.) | Water after reverse osmosis |
|---|---|---|---|
| Example | | | |
| Monovalent cations (A) (mg/l as CaCO₃) | 15.4 | 0.02 | 0.01 |
| Divalent cations (B) (mg/l as CaCO₃) | 12.5 | 1.21 | 0.00 |
| (A)/{(A) + (B)} × 100 | 55.2 | 1.6 | — |
| Monovalent anions (C) (mg/l as CaCO₃) | 19.9 | 0.23 | 0.01 |
| Divalent anions (D) (mg/l as CaCO₃) | 8.0 | 1.00 | 0.00 |
| (C)/{(C) + (D)} × 100 | 71.3 | 18.7 | (13–18)* |
| Carbon dioxide (mg/l as CaCO₃) | 10.0 | 0.0 | 0.0 |
| Comparison | | | |
| Monovalent cations (A) (mg/l as CaCO₃) | 15.4 | 0.04 | 0.02 |
| Divalent cations (B) (mg/l as CaCO₃) | 12.5 | 1.25 | 0.00 |
| (A)/{(A) + (B)} × 100 | 55.2 | 3.1 | — |
| Monovalent anions (C) (mg/l as CaCO₃) | 19.9 | 1.21 | 0.22 |
| Divalent anions (D) (mg/l as CaCO₃) | 8.0 | 0.08 | 0.00 |
| (C)/{(C) + (D)} × 100 | 71.3 | 93.8 | (1–3)* |
| Carbon dioxide (mg/l as CaCO₃) | 10.0 | 0.0 | 0.0 |

*Numerals in parentheses represent specific resistances (MΩ · cm at 25° C.).

As is evident from Table 1, with the system of this invention, monovalent anions were selectively removed by the anion-exchange membrane comprising membranes selectively permeable to monovalent anions arranged in the electrodialysis unit, and then divalent or polyvalent anions were captured by the reverse osmosis unit. Therefore, this system allowed production of ultra-pure water with extremely reduced concentrations of cations and anions. By contrast, as is obvious from the table, when the system used the electrodialysis unit where anion exchange membranes of no selective permeability were implemented, the concentration of monovalent anions in the treated water increased, and those anions, even when treated by the reverse osmosis unit in the subsequent step, could not be thoroughly removed. The TOC concentration in the ultra-pure water was 30μgC/l or less for both cases. The concentrations of cations and anions listed in Table 1 were derived by atomic absorption photometry and ion chromatography, respectively.

Industrial Applicability

According to the ultra-pure water producing system of this invention, the electrodialysis unit at the front stage selectively removes monovalent cations and anions in the crude water by the use of the membranes selectively permeable to monovalent cations and those selectively permeable to monovalent anions arranged in the unit, and the reverse osmosis unit removes divalent and polyvalent cations and anions from the crude water. Accordingly, the use of the present system enables a stable production of ultra-pure water in which the concentrations of cations and anions are 0.1 ppm or less. Further, the system of this invention allows one to procure a sufficient amount of ultra-pure water thoroughly deprived of electrolytes, minute particles and organic substances without being bothered with maintenance works such as renewal treatment of ion-exchange resins.

What is claimed is:

1. A system for producing ultra-pure water consisting essentially of:
    an electrodialysis unit comprising a membrane selectively permeable to monovalent cations and a membrane selectively permeable to monovalent anions; and
    a reverse osmosis unit which is connected after the electrodialysis unit in series and to which a diluate from the electrodialysis unit is introduced.

2. The system for producing ultra-pure water as described in claim 1, wherein the membrane selectively permeable to monovalent cations has a selective permeability constant ($P^{Ca}/_{Na}$) of less than 0.5 to sodium and calcium ions.

3. The system for producing ultra-pure water as described in claim 2, wherein the membrane selectively permeable to monovalent anions has a selective permeability constant ($P^{SO4}/_{Cl}$) of less than 0.5 to chloride and sulfate ions.

4. The system for producing ultra-pure water as described in claim 1, wherein the membrane selectively permeable to monovalent anions has a selective permeability constant ($P^{SO4}/_{Cl}$) of less than 0.5 to chloride and sulfate ions.

5. Process for producing ultra-pure water consisting essentially of the steps of:
    introducing water to be treated into an electrodialysis unit depending on the use of membranes selectively permeable to monovalent cations and of membranes selectively permeable to monovalent anions, and introducing the treated water into a reverse osmosis unit.

6. The system for producing ultra-pure water as described in claim 5 wherein the concentration of polyvalent anions contained in the diluate is not less than 1 ppm.

7. The system for producing ultra-pure water as described in claim 5 wherein the concentration of polyvalent cations contained in the diluate is not less than 1 ppm and the concentration of polyvalent anions contained in the diluate is not less than 1 ppm.

8. The system for producing ultra-pure water as described in claim 5 wherein the total concentration of polyvalent cations and polyvalent anions contained in the diluate is not less than 2 ppm.

* * * * *